March 12, 1968  H. ORNER  3,372,605
BALL-BEARING SCREW AND NUT MECHANISM
Filed Oct. 19, 1965  2 Sheets-Sheet 2
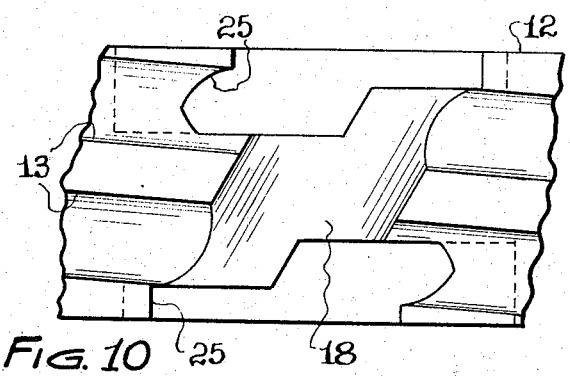
Fig. 10
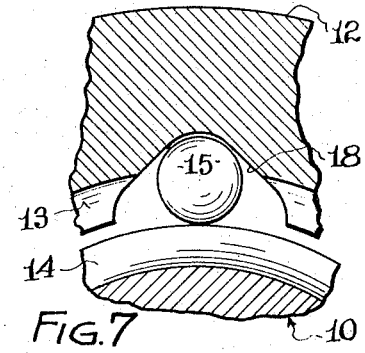
Fig. 7
Fig. 9
Fig. 8
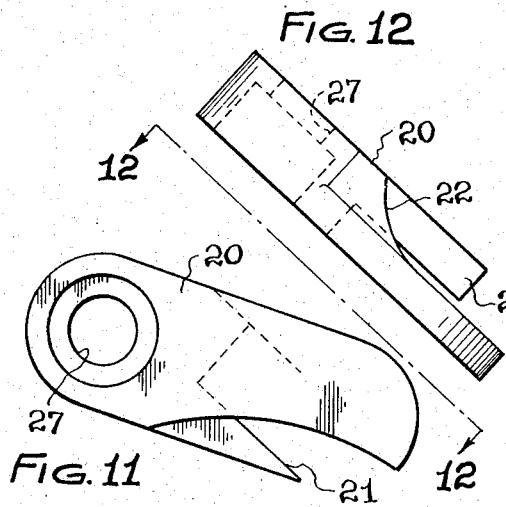
Fig. 11  Fig. 12
Fig. 13  Fig. 14
INVENTOR.
Harry Orner United States Patent Office 3,372,605
Patented Mar. 12, 1968

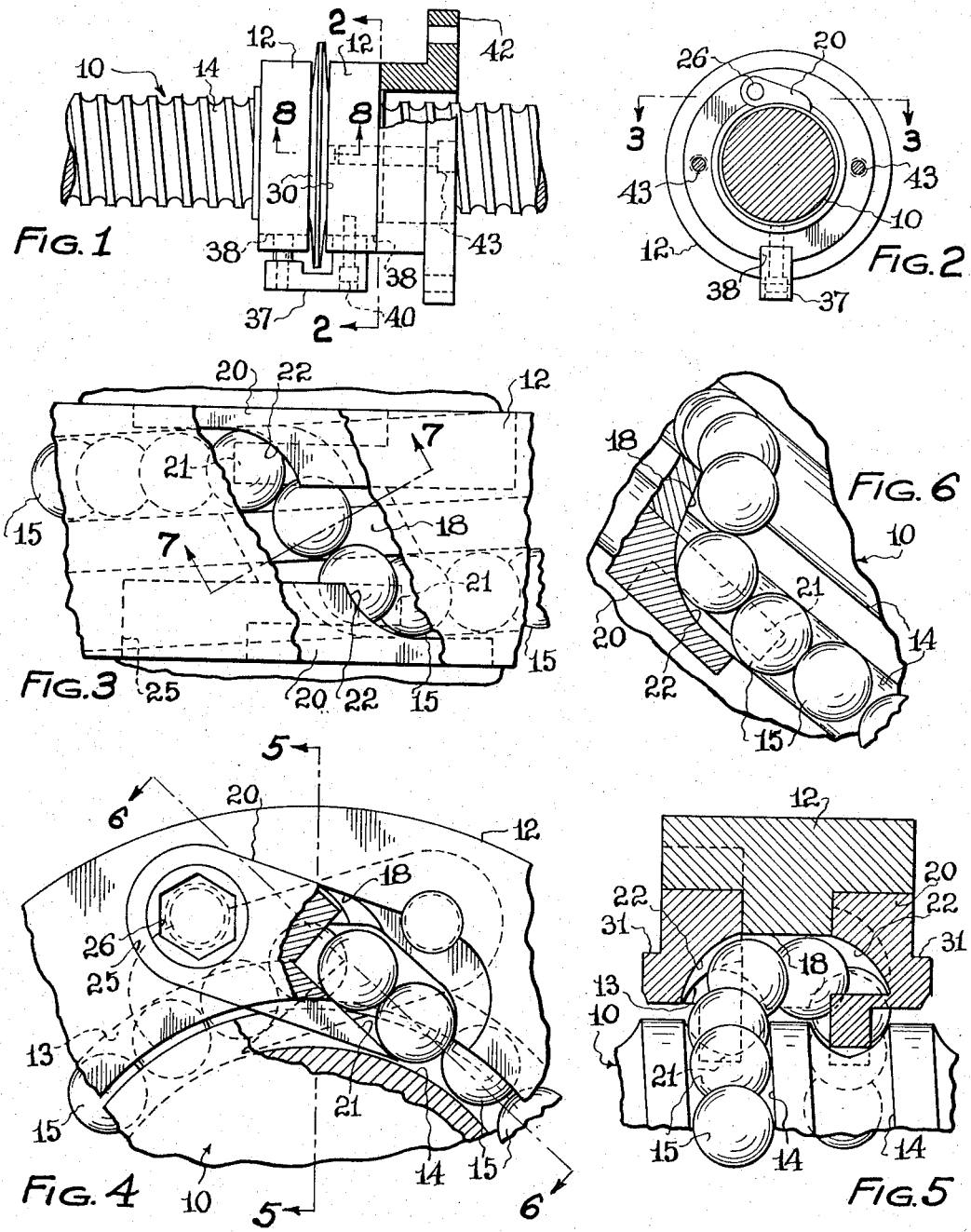

3,372,605
BALL-BEARING SCREW AND NUT MECHANISM
Harry Orner, 2479 Glen Canyon Road,
Altadena, Calif. 91001
Filed Oct. 19, 1965, Ser. No. 497,834
9 Claims. (Cl. 74—459)

ABSTRACT OF THE DISCLOSURE

A ball-bearing screw and thin nut mechanism with a simple recirculating passage in the nut for the balls to recirculate from one end of the ball race load groove to the other end. The recirculating passage is formed as a channel through the nut at the internal helical groove. Pick-up structures located on both sides of the nut at the junction of the recirculating passage and the load groove to transfer the balls to and from the load groove include an inclined finger extending into the load groove of the screw and have a curved surface normal to the inclined surface to guide the balls on the inclined surface from the load groove to the channel, and from the channel to the load groove at the opposite end.

---

Ball-bearing screw and nut mechanism are widely used for a number of applications in which it is desired to transform rotary motion to linear motion, or vice versa. The recirculating structure of all present ball-bearing nuts and screws has assembled component parts that lack efficient continuity to provide smooth transition of the balls from the ball race grooves to the recirculating system and vice versa. The reason for this is due to the length of the recirculating structure requiring the energy of the last ball coming off the load groove to push the long line of balls thru the recirculating system and on to the other end of the load groove. It further becomes more difficult with increased loss of energy as these balls are required to change direction in the recirculating structure.

The present invention provides a ball-bearing nut and screw structure obviating the foregoing major disadvantages and others as will be apparent by the following disclosure. In lieu of the long recirculating system of former design, this invention employs a recirculating path within the nut structure of the minimum length by recirculating the balls over a single crest of the ball-bearing screw and in such manner that the contact of the balls in the recirculating system on the screw supplements energy to the circulation of the balls thru the recirculating system.

It is the primary object of this invention to provide an improved ball-bearing screw and nut structure of relatively high values of efficiency in recirculating the balls thru a single turn ball-bearing nut.

Another object of this invention is to provide a ball-bearing nut structure with a recirculating passage that will move the balls over a single crest of the mating ball-bearing screw.

Another object of this invention is to provide a ball-bearing nut structure of such construction in the recirculating passage as to move the balls therein in the same general direction as the rotation of the screw or nut.

Another object of this invention is to provide a ball-bearing nut structure having the minimum length of the recirculating passage.

Another object of this invention is to provide a ball-bearing nut structure having a recirculating system of simple structure that lends for economical construction and mass production.

Another object of this invention is to provide a ball-bearing nut structure having solid pick-up structure for recirculating the balls into and out of the load groove.

Another object of this invention is to provide a ball-bearing nut structure that can be fabricated by standard methods of manufacturing.

These and other objects and advantages of this invention will be more fully set forth in the following specifications and claims considered in connection with the attached drawings to which they relate.

In the drawings:

FIGURE 1 is a view partly in longitudinal section of one preferred embodiment of a ball-bearing nut and screw mechanism, FIGURE 2 is a sectional view taken on the broken line 2—2 of FIGURE 1, FIGURE 3 is an enlarged fragmentary plan view of the ball-bearing nut structure with a portion broken away to illustrate the recirculating system, taken on broken line 3—3 of FIGURE 2, FIGURE 4 is an end view of FIGURE 3, FIGURE 5 is a sectional view taken on the broken line 5—5 of FIGURE 4, FIGURE 6 is a sectional view taken on the broken line 6—6 of FIGURE 4, FIGURE 7 is a sectional view taken on the broken line 7—7 of FIGURE 3, FIGURE 8 is an enlarged fragmentary sectional view taken on the broken line 8—8 of FIGURE 1, FIGURES 9 and 10 are detail views showing fragmentary structure of the ball-bearing nut of which FIGURE 9 is a fragmentary view of the nut similar to FIGURE 4 with all other component parts removed, and FIGURE 10 is a view taken on the broken line 10—10 of FIGURE 9, FIGURE 11 is a detail view of the pick-up structure, FIGURE 12 is a view 12—12 of FIGURE 11, FIGURE 13 is a modified form of FIGURE 11, and FIGURE 14 is a view 14—14 of FIGURE 13.

Referring to FIGURE 1, there is shown one preferred embodiment of this invention comprising a helically grooved screw 10 supporting thereon ball-bearing nuts 12, 12. Nut 12 is shaped with an internal helical groove 13 as best seen in FIGURE 8 and coacting with helical groove 14 of the screw 10 and mating therewith to form a loop race for a plurality of balls 15. The balls 15 are mounted in single turns or loops of the screw and nut grooves 13, 14. The end portions of these turns terminate at the ends of return or recirculating grooves 18.

The return groove 18 is formed, as shown most particularly in FIGURES 3, 4, 5, 6, and 7, as a V-section passage having a rounded portion at its bottom and on the side as best shown in FIGURE 7. This groove extends thru the nut at an angle of about thirty degrees with the axis of the screw, with such dimensions as to permit the balls 15 to pass freely over the crest of the load groove 14 of screw 10. This groove 18 can be formed by milling or broaching thru the ring-like structure 12; reference is made to the detail structure of the nut in FIGURES 9 and 10.

To lift the balls 15, at the junction of the ball races 13 and 14, and the recirculating groove 18, to pass over the crest of the load groove 14 of screw 10, is provided pick-up structure 20 as shown in detail in FIGURES 11 and 12. Referring in particular to FIGURE 4, the balls 15 rolling in load groove 14 approaching the recirculating passage 18 ride on the incline face 21 of pick-up 20 moving away from the load groove 14 toward the elevation of the crest of the load groove 14. At the same time the balls 15 move on to the crest as actuated by curved face 22 in an axial direction to the screw 10, and finally into passage 18 over the crest. The pick-up 20 is formed to fit into a provided groove 25 in the nut 12 and fastened in place by screw 26 passing thru a threaded hole 28 in the nut and hole 27 in the pick-up, and thus covers the open end of passage 18 on both sides.

The balls 15 passing over the crest in passage 18 is moved on to a similar pick-up 20, mounted on the other end of passage 18, moves down the inclined face 21 and outward on curved face 22 into the load grooves 13 and 14, and thereby actuated as a load carrying ball by the relative rotation of the nut 12 and screw 10, as best seen in FIGURES 3, 4, 5, and 6. This is a continuous operation of all the balls 15 in either direction of relative rotation of screw 10 and nut 12.

An interesting feature of this invention is, as the balls 15 are moved over the crest of the screw 10 in the passage 18, the balls ride on the crest of the turning screw and moved thereon through the passage 18. Thus this invention does not rely completely on the force of the last ball in the load groove to move the balls 15 through passage 18, resulting in these balls being moved faster with less jamming compared to other return structures.

The nuts 12 can be formed by machining or molding by the powder metal process. The pick-up 20 can be machined or also formed by powder metal process. A modified form of the pick-up 20′ is shown in FIGURES 13 and 14 which can be fabricated by stamping to serve the same purpose. Thus resulting in the fabrication of a ball-bearing nut which is economical to fabricate and will serve in equipment which would be otherwise economically prohibitive, and yet more efficient than any of the structure presently in use.

Nut structures 12, 12, are relatively thin and take little space on the ball-bearing screw. They can be used in pairs as preloaded nuts, see FIGURES 1, 2, and 8, to remove all possible end play along the screw 10. A pair of dished spring washers 30, 30, mounted on annular shoulders 31 of each of the nuts 12, are compressed between the two nuts forcing the balls 15 to contact load grooves 13, 14, on an inclined angle as shown by the broken lines 35, 35. The nuts 12, 12, are locked in place by the key structure 37 fitted into keyway 38 in each nut and retained in place by screw 40. A flange 42 can be mounted on the annular shoulder 31 and retained thereon by screws 43. This flange 42 serves the purpose of attaching any required mechanism which requires to be moved along the axis of screw 10. An example of such mechanism would be the cross-slide of a lathe or milling machine.

While this particular apparatus herein shown and disclosed in detail is fully capable of attaining the object and providing the advantages hereinbefore stated, it is to be understood that it is merely illustrative of the presently preferred embodiment of the invention and that no limitations are intended to the details of construction or design herein shown other than as defined in the appended claims.

I claim:

1. A ball-bearing screw and nut mechanism, comprising a screw with an external helical groove, a nut having a single turn of an internal helical groove, said grooves mating with each other to form a working ball race loop, a recirculating passage consisting of a straight groove across the said internal helical groove through said nut at an angle to the axis of said screw and means at the ends of said straight groove of said nut arranged to merge with the ends of said working ball race loop to form a single turn continuous endless ball race, said recirculating passage formed within said nut and free of abrupt changes in the direction of the ball travel over a single crest of said screw, and a plurality of balls mounted in said continuous ball race to lock said nut and screw in assembled relation.

2. The invention as claimed in claim 1, wherein said means at said recirculating passage and said ends of said working ball race loop include pick-up structures adapted to guide said balls to and from the opposite ends of said working ball race loop into and out of said recirculating passage, said pick-ups are secured in said nut closing the ends of said straight groove at each side of said nut, said pick-ups having an inclined surface extending into said load groove of said screw for said balls to roll up and down in relation to said crest of said screw, and a curved surface normal to said inclined surface to guide the balls on said inclined surface over to said crest of said screw.

3. The invention as claimed in claim 2, wherein said pick-up structure includes an elongated body fitted into a groove at each end of said nut at the extreme ends of said recirculating passage with a finger extending into said load groove of said screw, including said inclined surface for said balls to roll up or down in relation to said crest of said screw, said curved surface to guide the balls on said inclined surface over said crest of said screw formed in the inner side of said elongated body of said pick-up structure.

4. The invention as claimed in claim 2, wherein said straight groove is of a V cross-section formed with side walls inclined at an angle parallel with the said inclined surface of said pickup structure to confine said balls through a limited passage at the area where the balls roll on said pick-up structure.

5. A ball-bearing screw and nut mechanism comprising a screw with an external helical groove, a thin nut having a single turn of an internal helical groove, said grooves mating with each other to form a working ball race loop, a plurality of balls in said loop moved therethrough by the relative rotation of said screw and said nut, a recirculating passage in said nut consisting of a channel across the internal helical groove through said nut, which includes a pick-up structure with a first extended inclined surface in said helical groove of said screw for said balls and a second curved surface thereon to guide said balls axially across said inclined surface into said channel leading over the crest of the working ball race loop and extending in a direction at an angle to the axis of said screw, said channel leading to another pick-up structure with a first inclined surface and a second curved surface thereon to guide said balls across the said inclined surface back into the working ball race loop to form a continuous endless loop.

6. The invention as claimed in claim 5, wherein said recirculating passage consisting of a channel extends in a direction at an angle across said crest of said screw, slanted walls in said channel extending parallel with said first inclined surfaces of each of said respective pick-up structures, to thereby move said balls over said crest by the relative rotation of said screw and said nut by the coacting said slanted walls of said channel and said crest of said screw.

7. The invention as claimed in claim 6 wherein each of said pick-up structures with said first inclined surface and said second surface thereon is formed as a pick-up structure closing the ends of said channel and retained to said nut structure by retaining means.

8. A ball-bearing screw and nut structure comprising a screw with an external helical groove, a nut having an internal helical groove, said grooves mating with each other to form a working ball race loop, a recirculating passage in said nut extending over a crest of said working ball race loop and merging with the ends of said working ball race loop to form a continuous endless ball race consisting of a channel across the said internal helical groove through said nut and means to close said ends of said channel to transfer said balls to and from said ends of said working ball race, a plurality of balls in said endless ball race moved therethrough by the relative rotation of said screw and said nut, said recirculating passage extending over said crest of said screw in a direction so as to cause said balls to be moved by the crest of said screw and the wall of said passage coacting to move said balls over the crest in the same direction of rotation of said screw or said nut.

9. The invention as claimed in claim 8, wherein two of said nuts each having a reduced end diameter forming a radial shoulder are rotated toward each other on said screw, a dished spring washer with an internal diameter to fit on said reduced end diameter compressed therebetween, and means to lock said nuts to each other to prevent rotation relative to each other to preload the said balls in said working ball race loop of said nuts and said screw to remove all axial end play of said nuts with said screw relative to the elastic strain deformation of the said dished spring.

References Cited

UNITED STATES PATENTS

| | | | |
|---|---|---|---|
| 2,473,743 | 6/1949 | Barnes | 74—459 |
| 2,519,777 | 8/1950 | Cochrane | 74—459 |
| 2,618,166 | 11/1952 | Douglas | 74—459 |
| 2,919,596 | 1/1960 | Kuehl | 74—424.8 X |
| 2,978,920 | 4/1961 | Sears et al. | 74—409 X |
| 3,124,969 | 3/1964 | Grabowski et al. | 74—459 X |
| 3,156,133 | 11/1964 | Anthony | 74—459 |
| 3,161,073 | 12/1964 | Deutsch et al. | 74—459 X |
| 3,186,249 | 1/1965 | Lazenberger | 74—409 |
| 3,261,224 | 7/1966 | Anthony | 74—459 |

DONLEY J. STOCKING, *Primary Examiner.*

LEONARD H. GERIN, *Examiner.*